(12) United States Patent
Lowery

(10) Patent No.: US 11,049,302 B2
(45) Date of Patent: Jun. 29, 2021

(54) PHOTO REDACTION SECURITY SYSTEM AND RELATED METHODS

(71) Applicant: RealWear, Inc., Vancouver, WA (US)

(72) Inventor: Andrew Michael Lowery, South Pasadena, CA (US)

(73) Assignee: RealWear, Inc., Vancouver, WA (US)

( * ) Notice: Subject to any disclaimer, the term of this patent is extended or adjusted under 35 U.S.C. 154(b) by 130 days.

(21) Appl. No.: 16/450,583

(22) Filed: Jun. 24, 2019

(65) Prior Publication Data

US 2020/0402280 A1 Dec. 24, 2020

(51) Int. Cl.
*G06K 9/62* (2006.01)
*G06T 11/60* (2006.01)
*G06K 9/00* (2006.01)
*H04N 5/262* (2006.01)

(52) U.S. Cl.
CPC .......... *G06T 11/60* (2013.01); *G06K 9/00664* (2013.01); *H04N 5/2621* (2013.01); *G06T 2207/30232* (2013.01)

(58) Field of Classification Search
CPC .......... G06T 11/60; G06T 2207/30232; G06K 9/00664; H04N 5/2621
USPC .................................................. 382/159, 103
See application file for complete search history.

(56) References Cited

U.S. PATENT DOCUMENTS

| 9,841,601 B2 | 12/2017 | Schowengerdt |
| 10,108,306 B2 * | 10/2018 | Khoo ...................... G06F 3/048 |
| 2013/0141419 A1 | 6/2013 | Mount et al. |
| 2020/0404190 A1 * | 12/2020 | Hutz .................... G06K 9/4628 |

FOREIGN PATENT DOCUMENTS

GB 2530644 A 3/2016

* cited by examiner

*Primary Examiner* — Charlotte M Baker
(74) *Attorney, Agent, or Firm* — Shook, Hardy & Bacon LLP

(57) ABSTRACT

Methods, systems, and media are provided for redacting images using augmented reality. An image, such as a photograph or video, may be captured by a camera. A redaction marker, such as a QR code, may be included in the field of view of the camera. Redaction instructions may be interpreted from the redaction marker. The redaction instructions indicate a portion of a real-world environment that is to be redacted, such as an area that is not allowed to be imaged. Based on the redaction instructions, image data corresponding to the image may be redacted by deleting or encrypting a portion of the data associated with the portion of the real-world environment to be redacted. An image may be rendered using the redacted image data. The redacted image may be displayed or stored.

20 Claims, 10 Drawing Sheets

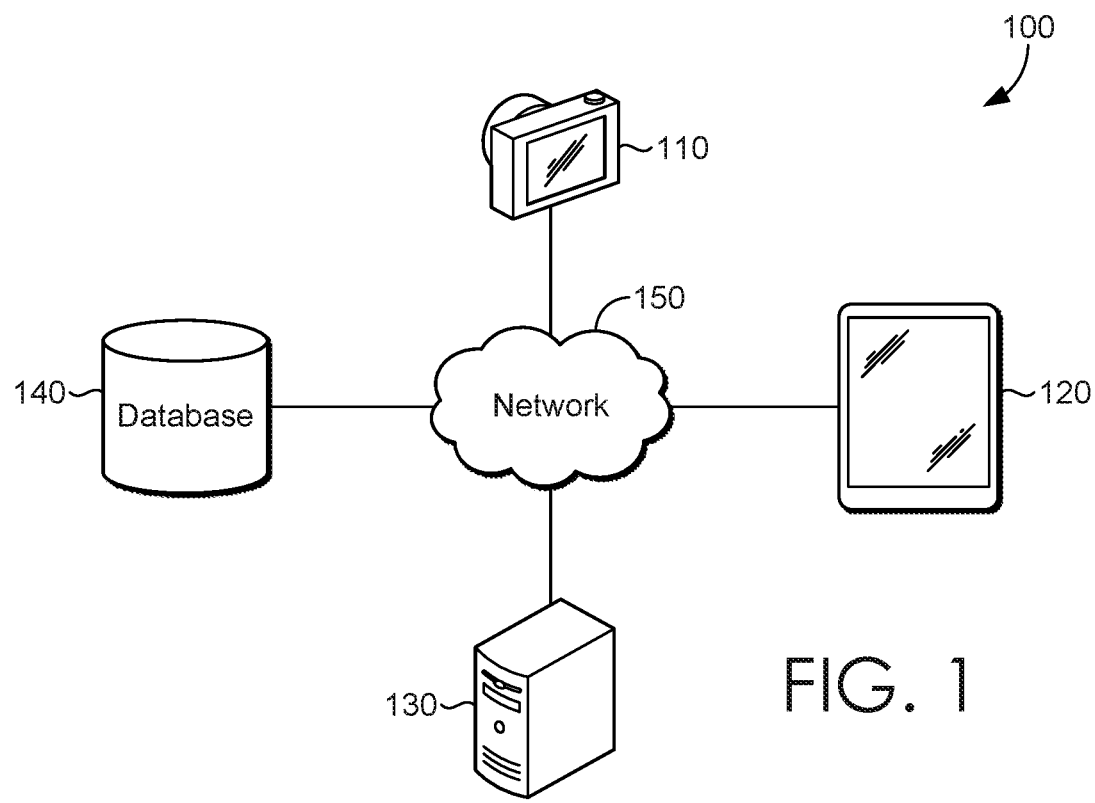
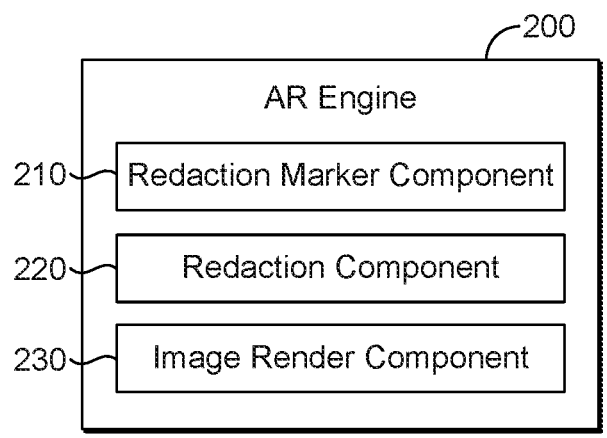

PHOTO REDACTION SECURITY SYSTEM AND RELATED METHODS

BACKGROUND

Traditionally, when taking images of an area that included classified or nonpublic items, great care had to be taken to not incidentally expose this nonpublic information. As an example, a manufacturing facility may use an assembly line to produce items. The production process or particular machinery used in the process may include nonpublic information, such as trade secrets, experimental methods, or classified information.

However, in some instances, individuals will be permitted access to the facility and may need to take pictures or video. This may occur in cases where portions of the facility require inspection, where machinery may require outside servicing, during an audit of license intellectual property, and in many other cases. To protect the nonpublic information from being incidentally imaged, the nonpublic areas or equipment is typically covered with large cloths. In many cases, the nonpublic items may not be functional during this time because of the actions required to conceal them. For example, an assembly line might have to stop in order to conceal one portion of a particular machine along the line. Making matters worse, this method of concealing nonpublic items or areas when images are being made is only marginally effective, as the coverings can be moved inadvertently, are difficult or impossible to use in some areas, or they do not cover the items from all angles. These problems often lead to incidental imaging of nonpublic information.

As a result, images must typically be scrutinized post hoc to ensure that no information was inadvertently disclosed. If images are revealed to have nonpublic information, the images must be digitally edited at a later time to remove the information. Risks of this process include not removing all of the information, or having edited images enhanced or reversed to expose the nonpublic information, either incidentally or maliciously.

SUMMARY

At a high level, aspects described herein relate to redacting images using augmented reality to enhance security of nonpublic information.

To render redacted images, a camera may capture image data that is associated with a real-world environment. A redaction marker may be within a field of view (FOV) of the camera when the image data is captured, e.g., an image or video is taken by the camera. The redaction marker may generally be any device that embeds computer-usable instructions or conveys computer-usable information. In a specific example embodiment, the redaction marker is a QR code.

The redaction marker may include redaction instructions. The redaction instructions generally convey what areas of the real-world environment are to be redacted or are permitted to be viewable. Using these instructions, image data may be redacted by deleting or encrypting portions of the image data that are associated with an area to be redacted or portions that are not associated with a permitted viewable area. The redacted image data may be used to render the redacted image.

In this way, the redacted image may exclude or obscure those areas that are not permitted to be viewed. The redacted image may be displayed on a display device or stored so that it can be reproduced. Security is enhanced because the redacted images are less likely to be reversed to view the redacted information, since the image data may be redacted prior to displaying the redacted image or storing the redacted image data. Further, the present technology reduces or eliminates the need for post hoc editing to remove portions of an image that are not permitted to be viewed.

Accordingly, one aspect provides a system for rendering a redacted image. The system comprises: a camera, a display device, at least one processor, and computer storage media storing computer-usable instructions. When executed by the at least one processor, the computer-usable instruction cause the at least one processor to capture, using the camera, image data representing a spatial area processor further. The processor further detects a redaction marker within the image data captured by the camera, and interprets, from the redaction marker, redaction instructions for the spatial area. The processor further redacts the image data based on the redaction instructions, and renders the redacted image using the redacted image data. The redacted image is displayed on the display device.

Another aspect provides for one or more computer storage media storing computer-usable instructions that, when executed by at least one processor, cause the at least one processor to perform operations for rendering a redacted image. The operations comprise receiving image data captured from a camera, the image data representing a spatial area and determining, from the image data, a presence of a redaction marker in a field of view of the camera. The operations further comprise interpreting, from the redaction marker, redaction instructions for the spatial area, and redacting the image data based on the redaction instructions. The operations further comprise rendering the redacted image using the redacted image data, and storing the redacted image for display on a display device.

In yet another aspects, a computer-implemented method for rendering a redacted image is provided. The computer-implemented method comprises receiving image data captured from a camera, the image data representing a spatial area, and redacting the image data based on redaction instructions determined from a redaction marker within a field of view of the camera. The method further comprises rendering the redacted image using the redacted image data, and storing the redacted image on one or more computer storage media.

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

Additional objects, advantages, and novel features of the technology will be set forth in part in the description which follows, and in part will become apparent to those skilled in the art upon examination of the following or learned by practice of the technology.

BRIEF DESCRIPTION OF THE DRAWINGS

The present technology is described in detail below with reference to the attached drawing figures, wherein:

FIG. 1 illustrates an example operating environment for redacting images, in accordance with an aspect described herein;

FIG. 2 illustrates an example augmented reality (AR) engine suitable for use in redacting images, in accordance with an aspect described herein;

DETAILED DESCRIPTION

Figure 3A:
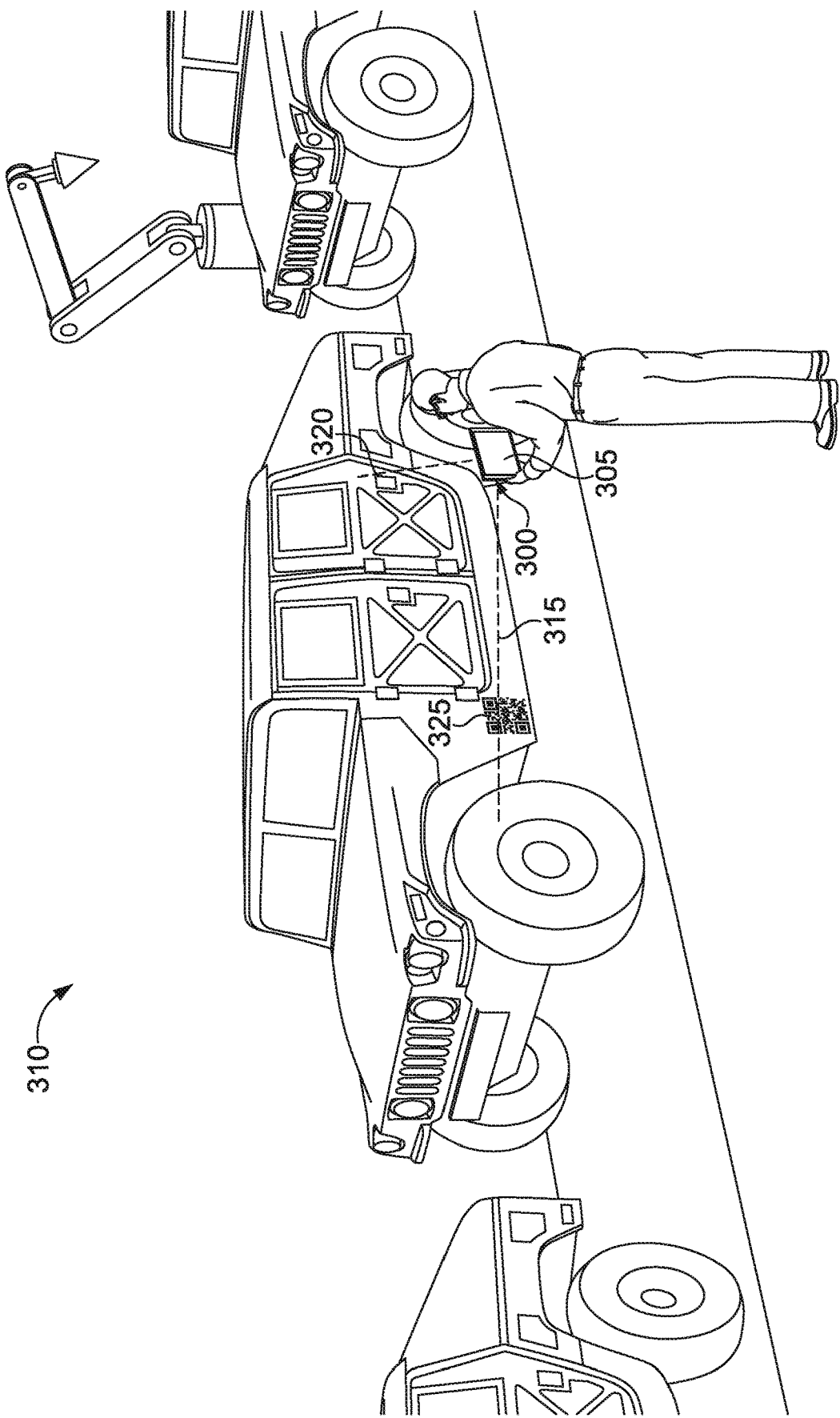
FIGS. 3A-3B illustrate an example use case of image redaction using an AR engine, in accordance with an aspect described herein.

The present disclosure generally relates to systems, methods, and media for redacting images and enhancing security of nonpublic information. At a high level, the technology may utilize augmented reality or a modified augmented reality in conjunction with information received from a redaction marker to redact images. "Augmented reality" is a process that typically involves superimposing data in the form of images onto a real-world background, as viewed through a display on a user device. Some aspects of the present technology could be referred to as a modified augmented reality system. Here, what is meant by "modified augmented reality" is that, unlike conventional augmented reality systems, some aspects redact image information prior to rendering and displaying a redacted image. As used throughout, "augmented reality" or "AR" may be used to refer to either augmented reality or modified augmented reality. By using augmented reality, real-world background images of a spatial area may be rendered and displayed on a user device with portions of the spatial area background redacted from display. Thus, from the viewpoint of a user, the visual images displayed may omit or conceal areas of the images from view.

In one example method for displaying redacted images or redacting image information for storage, a camera may capture image data. As an example, a user device having a display and a camera may be used. The camera captures image data that represents the visual images of the spatial area in the field of view (FOV) of the camera. The spatial area is all of or a portion of the real-world environment around the camera.

A redaction marker may be present somewhere in the spatial area. As an example, the redaction marker may be a QR code, which may be placed anywhere in the real-world environment. When the redaction marker is within the FOV of the camera, the captured imaged data may include data associated with the redaction marker. The user device may interpret redaction instructions from the redaction marker when the redaction marker is within the FOV of the camera. In general, the redaction instructions determined from the redaction marker may indicate all or a portion of the spatial area to conceal or redact from view when an image is rendered of the spatial area. Thus, when a redacted image of the spatial area is rendered and viewed on a display device, the redacted image may include a portion that is viewable and a portion that has been redacted from view based on the redaction instructions.

To render the redacted images for display or storage, the captured image data associated with the spatial areas to be redacted may be deleted or encrypted. For example, the redaction instructions determined from the redaction marker may indicate a portion of the spatial area is to be redacted when the spatial area is imaged. Image information associated with this portion may be redacted by deletion or encryption to provide redacted image information. When the image (such as a photo or video) is rendered using the redacted image information, then the portion of the spatial area that is associated with the redacted image information is omitted or obscured from view in the rendered image.

In some cases, the image data that is associated with the area to be redacted is altered, such as through encryption, so that the rendered image omits or obscures the area to be redacted according to the redaction instructions. Redacted image data may include image data where portions have been deleted, altered, or the like. Additionally, the redacted image data may be stored on a computer storage medium so that redacted images may be rendered at a later time.

This example, as well as other aspects that will be described for redacting images, solves several problems faced by traditional methods. For instance, as described, some traditional methods include physically concealing items or areas from view using large cloths, so that images may be taken without disclosing nonpublic information. Other traditional methods include post hoc editing, which requires images to be made of the nonpublic information and a later post hoc action to edit out portions of the image. Yet, these methods are only marginally effective, and they lead to many inadvertent disclosures of nonpublic information.

The technology presented in this disclosure solves many of these problems. Rather than cover objects with large cloths or edit images post hoc, aspects of the present technology may redact images as they are being rendered, and display the images using augmented reality or store the images for later use. The images may be redacted based on information received from the environment, e.g., from a redaction marker in the FOV of the camera capturing the images. In this way, images of an area may be made without incidentally imaging a nonpublic portion of the spatial area. Because of this, many operations may continue as normal while images are being made of the surrounding area. Further, this significantly reduces the risk that a post hoc image editor mistakenly does not edit out a nonpublic portion of the image, or that stored unedited images are incidentally or maliciously released into the public domain.

To solve some of these problems, aspects of the described technology delete or encrypt image data as the image is taken. This may also include storing the image data with the portions deleted or encrypted. By redacting the image data and storing the redacted image data as the image is being made, a person having malicious intent to reverse enhance an image and identify redacted portions is no longer able to because the image data is initially stored in a redacted form. Thus, security of the digital image is improved by technical operations of the user device and camera.

Further, the technology described in this disclosure performs activities that are not well-understood, routine, and conventional in the field. As noted, some aspects of the present technology utilize augmented reality to render images of a spatial area for display, where the images omit or obscure a portion of the spatial area. The omitted or obscured portions may be associated with image data that was redacted prior to display or storage of the image data. These operations are not well-understood, routine, or conventional in, for example, the field of image capture and render, or in the field of augmented reality. Instead, typical methods of redacting images require capturing an image and then post hoc editing the image. It is unconventional to redact images at or near the time the images are captured.

Further, typical augmented reality methods add information as an overlay to a background. It is unconventional in the field of augmented reality to redact information, and render redacted images from the redacted image information so that some portions of the rendered images are omitted or obscured.

Turning now to FIG. 1, FIG. 1 provides an example operating environment of a system suitable for redacting images. As illustrated, environment 100 includes camera 110, display 120, computing device 130, and database 140, which are communicating through communications network 150. In general, camera 110 may be any instrument for capturing optical information. For example, camera 110 may be used to capture images of a spatial area, e.g., all or a portion of the real-world environment around the camera. Camera 110 may capture optical information in the form of human-visible light, ultraviolet light, infrared light, or the like. The captured images may be digitally transformed into visual image data representing the captured images. Operating environment 100 is illustrated as further including display 120. Display 120 may be any display device that conveys visual information, such as images. Some example displays include light-emitting diode (LED) displays, liquid crystal displays (LCDs), plasma displays, and the like.

Camera 110 and display 120 may communicate with computing device 130 and database 140 using communications network 150. Computing device 130 illustrates an example computing device. FIG. 10 provides one example computing device suitable for use as computing device 130. While database 140 is illustrated as a single datastore, database 140 may be a single distributed database (or a set of databases), or stored information across one or more datastores that are integrated with other components, networked, or part of a cloud-based storage system. An example database suitable for use is provided with reference to memory 912 of FIG. 9.

Continuing with FIG. 1, communications network 150 communicatively couples components of environment 100, such as camera 110, display 120, computing device 130, and database 140. Communications network 150 may be any communications network, including any wired or wireless communication technologies, wired or wireless communication protocols, and the like. In general, communications network 150 may be virtually any network that communicatively couples components of a system.

It should be understood that operating environment 100 of FIG. 1 is provided to show an example operating environment 100 in which some embodiments of the present disclosure may be employed. This and other arrangements described herein are provided only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, some functions may be carried out by a processor executing instructions stored in memory.

Still referring to FIG. 1, one arrangement of the illustrated components may include one or more of the components included in a single user device. For example, camera 110, display 120, computing device 130, and storage 140 may form one user device, such as a tablet, smartphone, digital video recording device, or the like. In one example, each of the components or at least one of the components may be included in a wearable headset, e.g., camera 110 may capture image information, while display 120 may project redacted images for direct viewing by a wearer, such that the real-world environment is obscured partially or entirely from view. In one example, the wearable headset includes each of camera 110, display 120, computing device 130, and storage 140. In another example, the wearable headset may include at least one of these components, such as including display 120, while camera 110 is detached from the wearable headset, and in communication with the wearable headset, communicating via wireless protocol or cable (e.g., communication bus). In other examples, however, one or more of the components may be distributed. For example, an unmanned vehicle or "drone" (UAV, unmanned terrestrial vehicle, etc.) may include camera 110. However, display 120 may be wirelessly coupled to a user device operated by a pilot. All such examples are intended to be represented by FIG. 1, despite being illustrated as discrete, distributed components.

Operating environment 100 can be utilized to implement one or more of the components of AR engine 200, described in FIG. 2. Referring to FIG. 1 and FIG. 2, and to the disclosure more generally, a "system" refers to any device, process, service or combination thereof. As used herein, an "engine" is synonymous with system unless otherwise stated. A system may be implemented using components or generators as hardware, software, firmware, a special-purpose device, or any combination thereof.

Referring now to FIG. 2, FIG. 2 illustrates an example AR engine 200 suitable for use with the present technology. In general, AR engine 200 generates redacted image data for storage and renders redacted images for display. As illustrated, AR engine 200 comprises redaction marker component 210, redaction component 220, and image render component 230. Each of these components may be embodied as a set of compiled computer instructions or functions, program modules, computer software services, or an arrangement of processes carried out on one or more computer systems.

Redaction marker component 210 generally identifies and interprets redaction instructions from image information. Image information may initially be received by AR engine 200 from a camera, for example, camera 110 of FIG. 1. Image data may additionally or alternatively be received from storage, such as datastore 140 of FIG. 1. In either event, the image data received by AR engine 200 represents optical image information corresponding to a real-world environment, such that the image information may be used to render an image of the real-world environment for display or storage.

Redaction marker component 210 may identify a redaction marker within the received image data. A redaction marker may be any device or location that includes imbedded or communicable, machine-readable instructions. For example, a redaction marker may comprise any type of object or label having data that can be interpreted by a computing device, for example, by using object recognition. For example, the redaction marker may be any high contrast image asymmetrical around the x- and y-axes. Some non-limiting, specific examples include a 2D or 3D barcode, QR codes, ThingMarks, and the like. What is meant by "high contrast" is a contrast between to objects, colors, positions, etc. that is distinguishable by a computing device. In some cases, the redaction marker may comprise a tag that utilizes any type of near-field communication, such as an RFID, Bluetooth, or the like. The redaction marker may further be movable, so that it can be placed at one location and then moved to another if needed. The redaction marker may further include an attachment mechanism. As examples, the redaction marker may include an adhesive or a magnet that secures the redaction marker to an object at a desired location.

A location of the redaction marker may be determined remotely. To determine the location of the redaction marker, the redaction marker may include a beacon, such as a Bluetooth or Wi-Fi beacon, that remotely provides location data for the redaction marker. The beacon remotely transmits location data to a remote source. The remote source may include a user device, such as a tablet, phone, camera, or any other device that determines or receives location information. For example, a user computing device may receive a Bluetooth communication from the redaction marker to determine its location. Wi-Fi triangulation may be used to receive location information at Wi-Fi routers, which may transmit the location of the redaction marker to another device, such as the user device. Though only a few examples are provided for determining the location of the redaction marker, other methods of determining the location of the redaction marker may be employed and are intended to be included within the scope of this disclosure.

In an embodiment, the redaction marker may be a digital redaction marker. What is meant by a digital redaction marker is that the digital redaction marker may not have a physical presence or be associated with a physical object, such as a barcode or near field communication tag. In aspects that use the digital redaction marker, the digital redaction marker may comprise redaction instructions and a location stored on computer memory. That is, a location may be predefined as associated with redaction instructions, and the location along with the associated redaction instructions may be stored locally on a user device or remotely on a datastore in communication with the user device. Unless expressly stated otherwise, throughout this disclosure, the term "redaction marker" may refer to a redaction marker having a physical presence, such as a barcode or near field communication tag, or it may refer to a "digital redaction marker," or a combination of both.

The redaction marker may be designed or programmed to convey redaction instructions. Generally, redaction instructions indicate an area of a real-world environment that is to be redacted from view when imaged, such as when a photo or video is taken of the area. For example, redaction instructions may indicate an area of the real-world environment that is permitted to be viewable when imaged. In this example, areas not included in the viewable portion may be areas that are intended to be redacted when imaged. In another example, redaction instructions may indicate an area of the real-world environment that is intended to be redacted. In this example, the portions outside of the area to be redacted may be permitted as viewable areas. Redaction instructions may include both areas that are permitted to be viewable and areas that are to be redacted when imaged.

In some cases, the redaction marker may define hypothetical boundaries in space and identify areas relative to the boundaries as areas to be redacted or areas that are not to be redacted, e.g., those areas that are intended to be viewable. The redaction marker may include redaction instructions that define a boundary using distances from the redaction marker or define areas relative to the redaction marker. As an example, the redaction marker may include machine-readable instructions that define an area relative to the redaction marker, and include instructions whether to redact the area or permit the area to be viewed when imaged. That is, the redaction marker may identify a portion of a spatial area that is to be redacted or a portion of the spatial area that is a viewable area, or both. It will be appreciated that the redaction marker may include instructions that define the hypothetical area or hypothetical boundary lines at any location relative to the redaction marker.

Continuing reference to FIG. 2, redaction marker component 210 may identify a redaction marker in received image data. That is, when image data captured from a camera includes a redaction marker, e.g., the redaction marker is within the FOV of the camera, redaction marker component 210 may identify the presence of the redaction marker to interpret the machine-readable instructions embedded in the redaction marker. One example method for identifying the redaction marker within the image data is a machine learned model, for example, such as one determined using a neural network or any other type of machine learning method. A machine learned model may be trained using image data that includes a known redaction marker, for example, such as an image of a QR code or other machine readable image. Once trained, the machine learned model may be utilized to identify the presence of redaction markers in image data from captured images.

Redaction marker component 210 may further interpret embedded machine readable instructions in a redaction marker. For example, a machine readable tag, such as an RFID tag, may be scanned by an RFID reader associated with a user device so that the user device receives the embedded redaction instructions. The user device may include or communicate the redaction instructions to redaction marker component 210. Similar methods may be used with other near field communication systems. Where the redaction marker includes a machine-readable label, such as a QR code, to continue with the same example, redaction marker component 210 may interpret the redaction instructions from the information displayed on the label. In another example, the redaction marker may communicate wirelessly to a user device that includes redaction marker component 210. For example, Bluetooth, Wi-Fi, or any other wireless communication method, may be used to communicate redaction instructions from the redaction marker.

Additionally or alternatively, redaction marker component 210 may receive redaction instructions from a digital redaction marker. For example, a user device may receive redaction instructions locally or from a remote storage. In some cases, the user device receives the redaction instructions based on its location. For example, the user device may have a user device location. The redaction marker component 210 of the user device may receive redaction instructions based on the user device location relative to the digital redaction marker. Put another way, if the user device is within a defined distance from the digital redaction marker, the redaction instructions may be received by redaction marker component 210. The defined distance may be any distance. As examples, the distance may be up to 5 feet, up to 25 feet, up to 50 feet, up to 100 feet, up to 1000 feet, and so forth. In some aspects, a redaction marker may be considered within the FOV of a camera, as described herein, when the camera is within the defined distance from the digital redaction marker.

Further, redaction marker component 210 may determine which portion of the image information is associated with an area to be redacted. For instance, similar to the redaction marker, the location of the camera may be determined using Wi-Fi triangulation, cell signal triangulation, GPS, or any other location technology. Redaction marker component 210 may utilize the location or position of the camera relative to the redaction marker to determine portions of the image data associated with an area to be redacted. For example, if the camera is positioned close to the redaction marker, the area to be redacted will appear larger than when the camera is positioned further away from the camera. If the camera is positioned to the side or behind the redaction marker, the area to be redacted may appear to shift relative to the positions of the redaction marker and the camera.

In another example, redaction marker component 210 may determine which portion of the image information is associated with an area to be redacted by using the orientation of the redaction marker relative to the FOV of the camera. For instance, as the camera moves closer to the redaction marker, the redaction marker appears larger within the FOV of the camera. Similarly, the area to be redacted as interpreted from the redaction marker would also appear larger in the camera's FOV. If the camera moves further away from the redaction marker, the redaction marker appears smaller in the FOV of the camera. Similarly, the area to be redacted would then appear smaller relative to the background in the FOV. If the camera moves in another direction, left, right, behind, etc. relative to the redaction marker, the redaction marker will appear at an angle relative to the FOV of the camera. As such, the area to be redacted may also appear at an angle relative to the camera. Using these example methods, redaction marker component 110 may determine the area to be redacted relative to the area that is viewable within the FOV of the camera, based on the redaction instructions provided by the redaction marker.

In some aspects, redaction marker component 210 may determine which portion of the image data is associated with an area to be redacted based on the location and orientation of a user device. As noted, the user device may have a user device location, which may be determined using methods previously described. A user device may further have an associated orientation, which may be determined by a gyroscope and accelerometer in the user device. For example, the user device may be tilted forward, backward, side-to-side, rotated, etc. Each of these movement changes the FOV of the camera associated with the user device. Redaction marker component 210 may determine what portions of the spatial area within the FOV of the camera are to be redacted based on the location and orientation. That is, as a viewable area, which may be defined by the redaction instructions, moves across the FOV when the orientation of the camera changes, the portion of the spatial area that is to be redacted may similarly move across the FOV. In this way, redaction marker component 210 may determine the portion of image data corresponding to the area to be redacted relative to the portion of the image data corresponding to the viewable arear.

Redaction component 220 may redact image information associated with an area to be redacted as determined by redaction marker component 210. To redact the image data, redaction component 220 may delete or encrypt image information associated with the area to be redacted. Redacted image data may include captured image data that has had data portions associated with the area to be redacted deleted or encrypted. When redaction component 220 deletes portions of the image data, the redacted image data may not include image data associated with the area to be redacted. When redaction component 220 encrypts image information, the redacted image data may include image data associated with an area to be redacted, but this portion of the image data may be altered such that an image may not be recreated from the altered data unless decrypted. Thus, redacted image data may include image data that has been encrypted such that an encryption key will decrypt the data in order to recreate the redacted portion of the associated image. Redacted image data may be saved, for example, in database 140 of FIG. 1, or communicated directly to image render component 230.

Image render component 230 generally renders a redacted image from the redacted image data generated from redaction component 220. The redacted image rendered by image render component 230 may obscure or exclude the area of the real-world environment that is to be redacted in accordance with the redaction instructions. This is because the image data associated with the area to be redacted was previously deleted or encrypted. For example, where redacting the image data includes deleting a portion of the image data, the rendered redacted image may exclude a visual representation of the areas associated with the deleted image data, while the image data included in the redacted image data is used to render a viewable area in the rendered redacted image. Similarly, where redacted image data includes encrypted image data, areas of the rendered image associated with the encrypted image data may be obscured from view, while image data of the redacted image data that is not encrypted may be use to render a viewable area in the redacted image. Image render component 230 may communicate the rendered redacted image for display on a display device.

In some cases, image render component 230 of AR engine 200 may not render an image until a redaction marker with instructions is detected. In this example, a user device may be prohibited from rendering any image for display or storage in an area until the redaction marker is detected. This provides additional security by only allowing images to be made of areas defined or determined as viewable based on the redaction instructions. In some cases, image render component 230 may render an image to include the entire background, i.e., the redacted area and the viewable area. However, when the image data associated with the image is stored, the portions to be redacted are not stored or are encrypted. In this way, image render component 230 may render an image for display at a user device so that images of an area are more easily made using the user device. However, the image data is saved as redacted image data so that, when an image is reproduced from the saved redacted image data at a later time, the reproduced image is redacted.

As with other aspects in this disclosure, FIG. 2 is provided only as an example, as other arrangements, including more or less elements may be used. Many of the described elements are functional entities that may be implemented as discrete or distributed components or in conjunction with other components, and in any suitable combination and location.

Figure 3B:
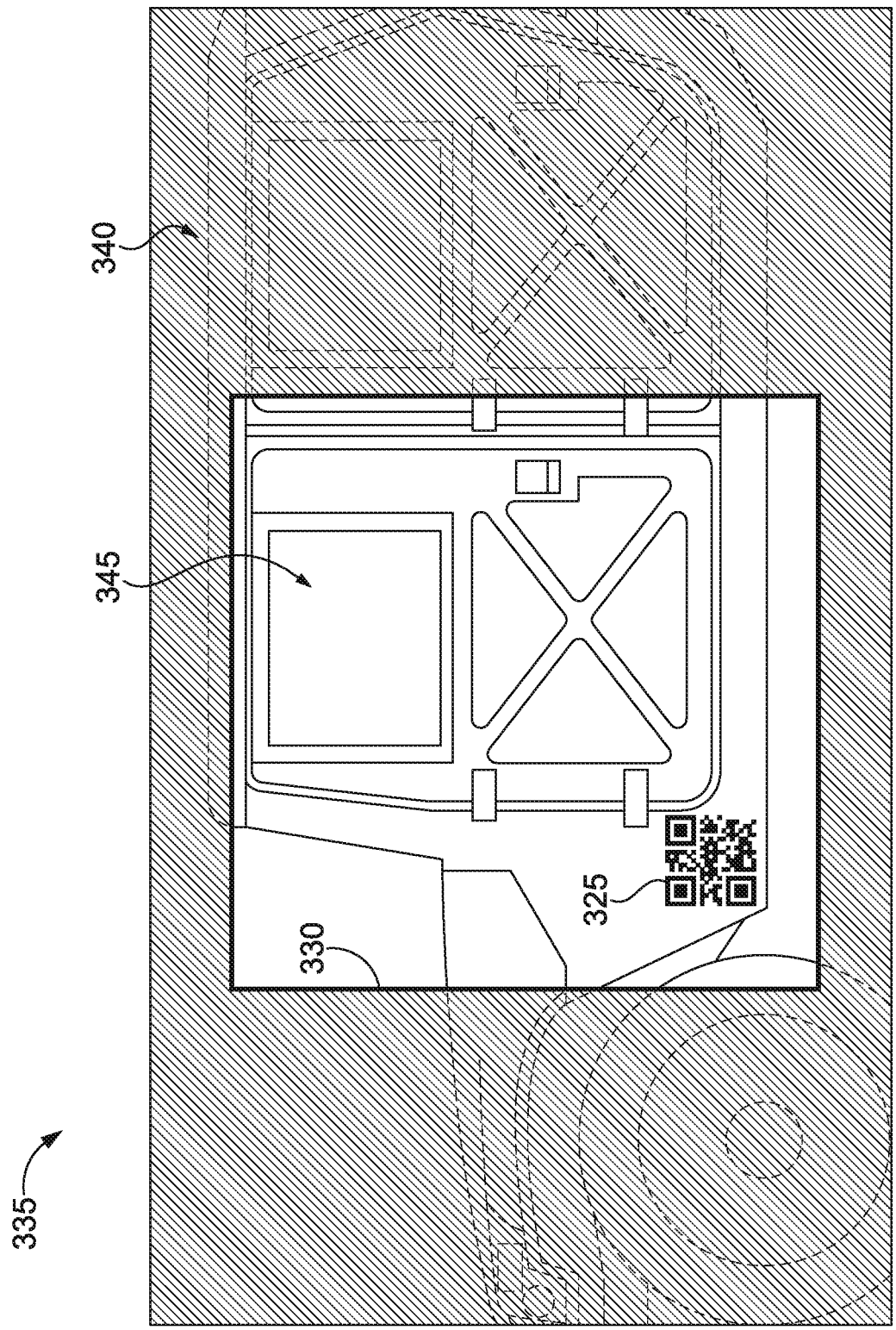

Turning now to FIGS. 3A and 3B, the figures illustrate an example use case for AR engine 200. FIG. 3A illustrates user device 300 having display 305. User device 300 is illustrated as imaging a portion of spatial area 310. Spatial area 310 represents a real-world environment. FIGS. 3A and 3B illustrate one example use case for the technology described herein; however, many others are contemplated.

The particular use case is provided as an example to aid in describing the present technology. Here, the real-world environment is intended to illustrate an assembly line of an example manufacturing facility for a vehicle. Certain portions of the manufacturing process may be trade secret. However, some portions of the manufacturing process may be subject to inspection by a third-party that may wish to image the objects or areas that it is inspecting. The technology provided herein may allow an inspector to image certain areas or objects in the process, while redacting other surrounding portions of the process from the image and from the image data. In this way, the objects or areas of the manufacturing process may be imaged during the inspection, while the portions of the manufacturing process that are not public may be redacted. In some embodiments, image data is redacted at the time is captured. This may eliminate having to edit a video or photo post hoc, thereby improving security during the inspection process. And in some embodiments, since the image information is redacted at the time it's captured, the nonpublic portions may be encrypted or deleted prior to storing the image information, so that the image cannot be reverse edited to determine the redacted portions.

As illustrated in the example provided in FIG. 3A, user device 300 may be used to image a portion of spatial area 310. As previously described, a camera (not shown) associated with user device 300 may be used to capture image data representing the portion of spatial area 310 that is being imaged. The portion of spatial area 310 being imaged is within an FOV of the camera associated with user device 300. The FOV of the camera is illustrated using first hypothetical line 315 and second hypothetical line 320. The FOV of the camera of user device 300 is illustrated here as the portion of spatial area 310 between first hypothetical line 315 and second hypothetical line 320. It will be appreciated that first hypothetical line 315 and second hypothetical line 320 provided for illustration only and to more easily describe the camera's FOV.

As illustrated in FIG. 3A, included in the FOV is redaction marker 325, illustrated here as a QR code. It will be understood that, while illustrated as a QR code, redaction marker 325 may be any of the embodiments described herein, including another high contrast image asymmetrical around the x- and y-axes or a digital redaction marker. As previously described, redaction marker 325 may have embedded computer-usable instructions that may be interpreted by user device 300 to provide redaction instructions. For example, user device 300 may utilize all or portions of AR engine 200, such as redaction marker component 210, of FIG. 2 to identify redaction marker 325 and interpret the embedded redaction instructions. The embedded instructions may include what portion of spatial area 310 is to be redacted when producing an image of spatial area 310.

Turning to FIG. 3B, FIG. 3B is an illustration of rendered image 335 of spatial area 300 between first hypothetical line 315 and second hypothetical line 320 as displayed on display 305 in FIG. 3A. Based on the redaction instructions interpreted from redaction marker 325, redaction boundary lines 330 may be determined. It will be appreciated that, while illustrated in FIG. 3B as a square that encompasses redaction marker 325, redaction boundary lines 330 may be defined at any location relative to redaction marker 325 and may be in any shape and define any sized area. It will also be appreciated that redaction marker 325 may be located in an area to be redacted or may be located in an area that is permitted to be viewable. As shown in FIG. 3B, redaction marker 325 is located in an area that is permitted to be viewable. Additionally, while illustrated as bold lines, it will also be appreciated that redaction boundary lines 330 may or may not be visible in the rendered image. Redaction boundary lines 330 are illustrated here only to aid in describing an example of an area to be redacted.

In this example, the redaction instructions provided by redaction marker 325 include instructions to redact area 340 outside redaction boundary lines 330. While shown as slashed lines with a dashed background in FIG. 3B, it will be understood that redacted area 340 may be obscured from view. As previously described, image information associated with redacted area 340 may be redacted, such as being deleted or encrypted.

Rendered image 335 may further include viewable area 345, which may be a non-redacted area. Viewable area 345 may include a portion of spatial area 310 of FIG. 3A that is permitted to be viewed or imaged based on the instructions provided by redaction marker 325. For example, the redacted image data may be used to render viewable area 345.

Figure 4A:
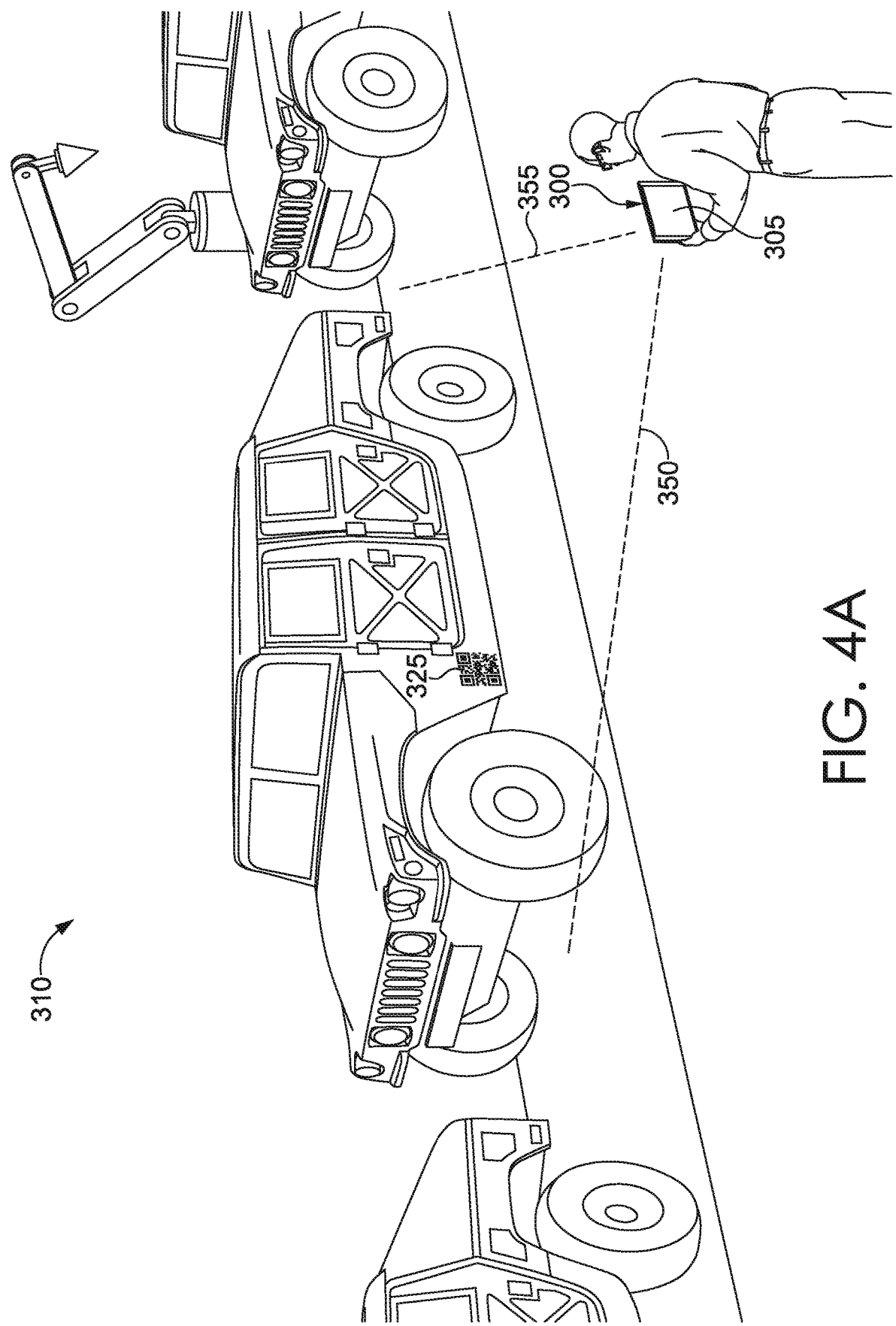
FIGS. 4A-4B provide another illustration of the example use case of FIGS. 3A-3B, in accordance with an aspect described herein.

With reference now to FIG. 4A, FIG. 4A illustrates the same spatial area 310 and the same redaction marker 325 having the same redaction instructions as FIG. 3A. In FIG. 4A, user device 300 is located in a different position relative to redaction marker 325. Here, user device 300 is illustrated as being further away from redaction marker 325. Because user device 300 is located further away from redaction marker 325, the FOV of a camera associated with user device 300 has changed, and is now represented as third hypothetical line 350 and fourth hypothetical line 355.

Figure 4B:
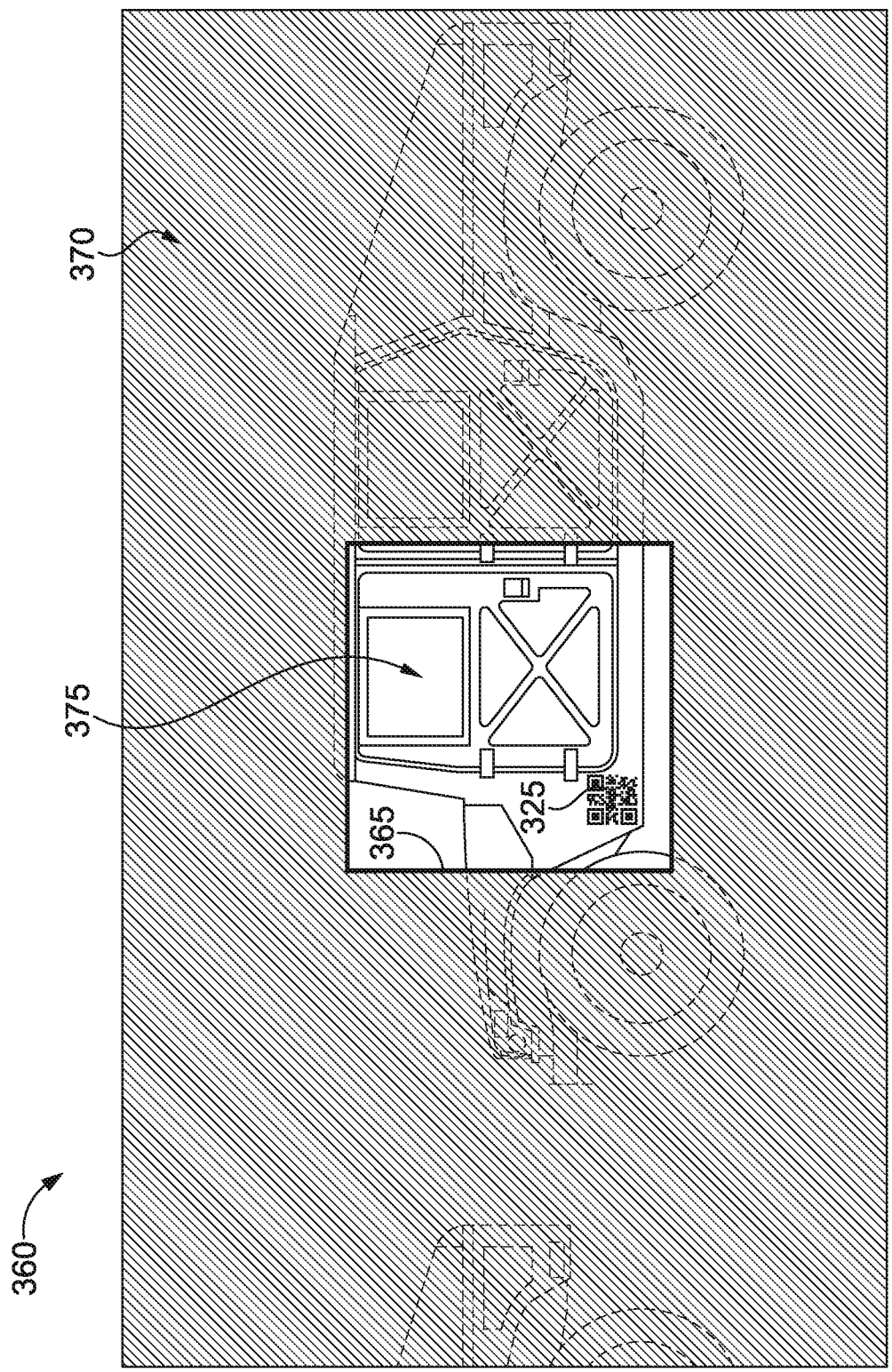

Image information captured by the camera of user device 300 may be used to render image 360 in FIG. 4B. In rendered image 360, redacted area 370 appears to cover a greater area than redacted area 340 of FIG. 3B. Viewable area 375 appears to be a smaller area than viewable area 345 of FIG. 3B. This is because the FOV of user device 300 of FIG. 4A has changed relative to redaction marker 325. While viewable area 375 of rendered image 360 in FIG. 4A appears smaller, the portion of spatial area 310 included in viewable area 375 is the same as the portion of spatial area 310 included in viewable area 345 of FIG. 3B, since the redaction instructions are the same. Thus, a location of the camera relative to redaction marker 325 may be used to redact image information and render a redacted image, e.g., the image data may be redacted based on the relative location of the camera to redaction marker 325.

It will be understood that user device 300 of FIGS. 3A and 4A may be moved to other locations. With each location, the FOV of the camera of user device 300 will change. A rendered image associated with each location may include a different redacted area relative to the viewable area. However, the viewable area may include the same portion of spatial area 310 in each image. In this way, regardless of the location of user device 300, portions of the spatial area that are not public will not be rendered in an image of the area or stored as image data.

Figure 5:
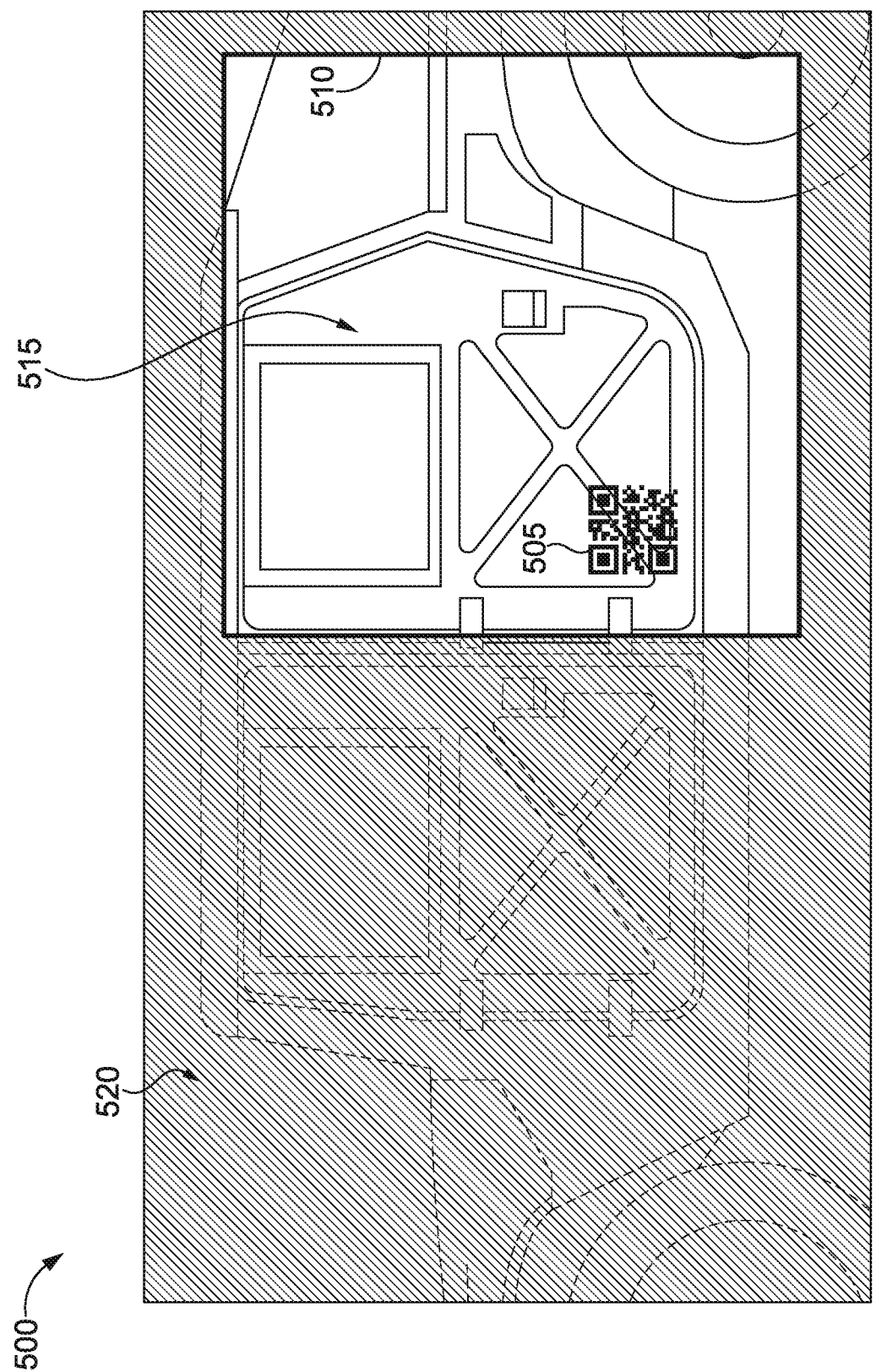
FIG. 5 illustrates an example rendered image for a particular use case scenario, in accordance with an aspect descried herein.

It will further be appreciated that, in embodiments where the viewable areas and redacted areas are defined relative to the redaction marker, moving a redaction marker moves the viewable area. Turning to FIG. 5, FIG. 5 provides an example rendered image 500. Rendered image 500 is a portion of spatial area 310 in FIGS. 3A-3B and 4A-4B; however, redaction marker 505 has been moved to a different location, but includes the same redaction instructions. In this example, boundary lines 510, viewable area 515, and redacted area 520 are moved relative to redaction marker 505 in rendered image 500. In this way, redaction markers may be moved around to permit or prohibit images to be made of particular areas.

Figure 6:
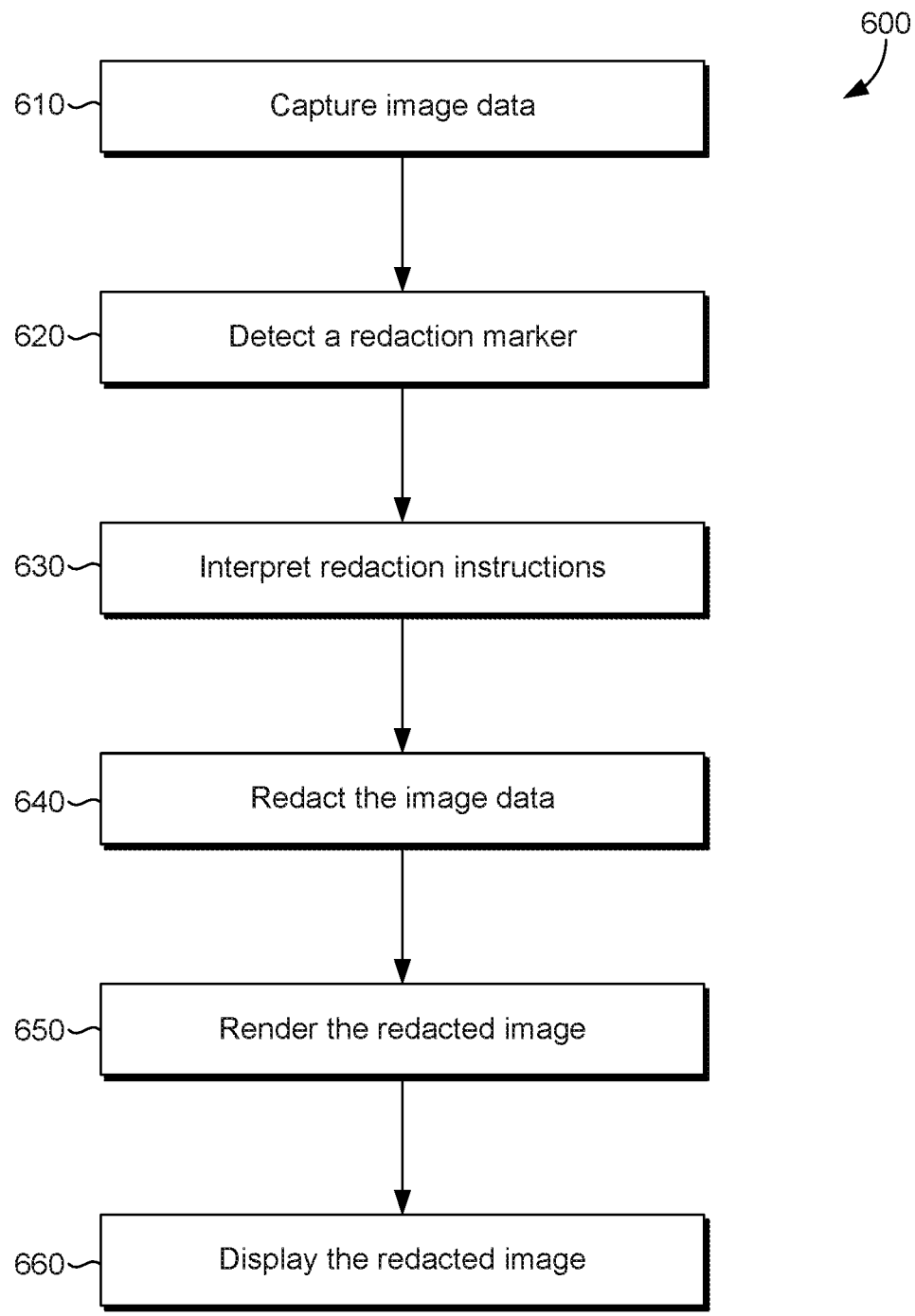
FIGS. 6-8 are flow charts illustrating example methods for rendering a redacted image, in accordance with aspects described herein.
Figure 7:
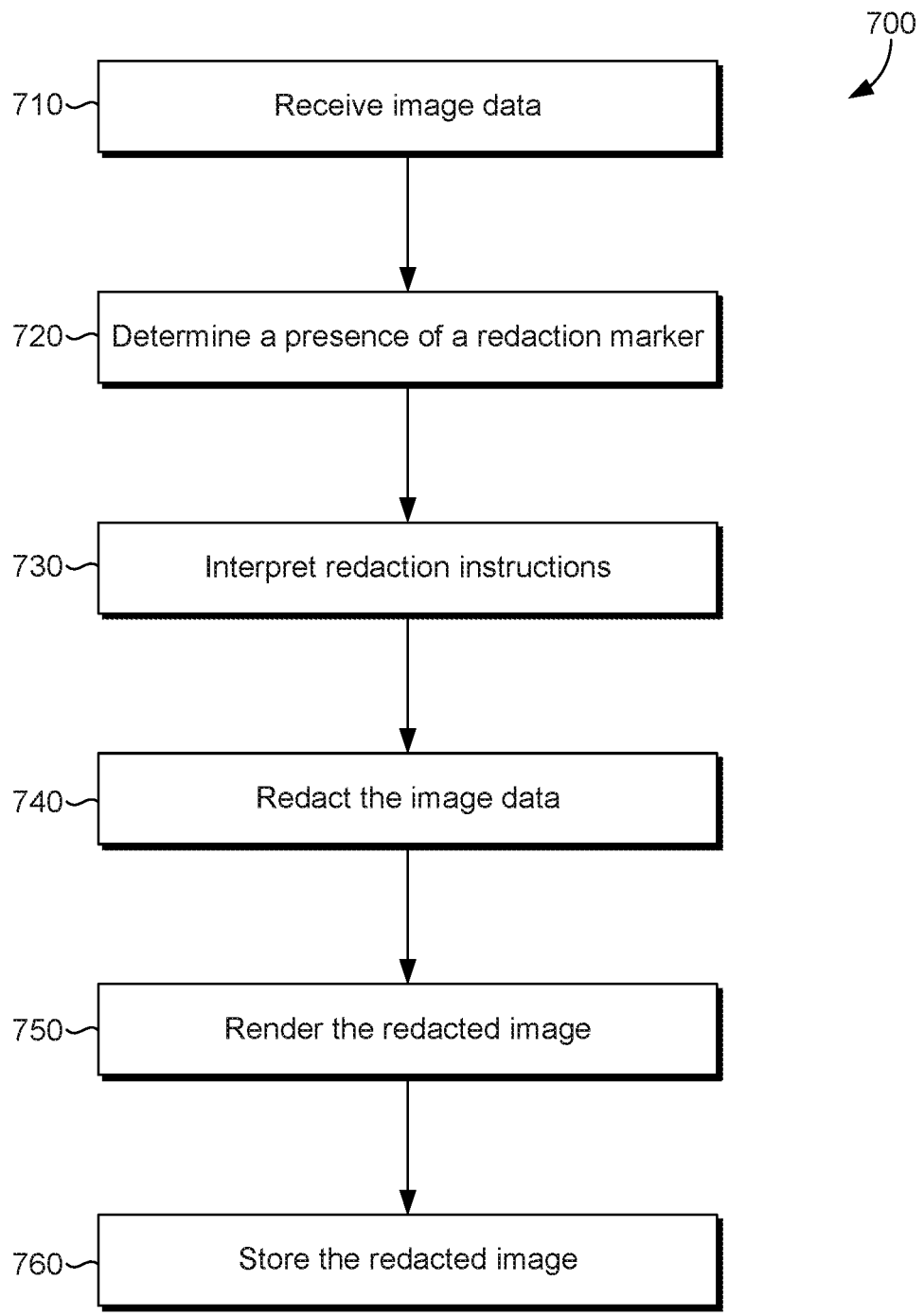
Figure 8:
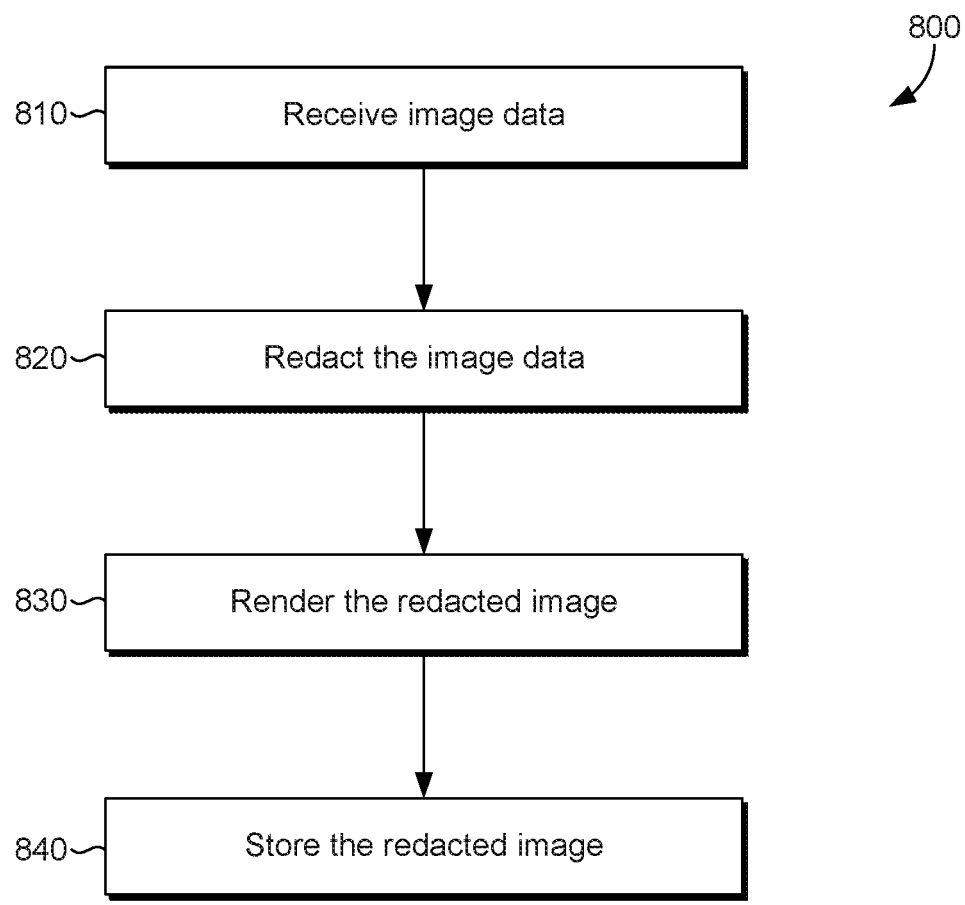

With reference now to FIGS. 6-8, flow diagrams are provided illustrating example methods for redacting image data and displaying redacted images in augmented reality. The methods may be performed using technology previously discussed. In embodiments, one or more computer storage media having computer-executable instructions embodied thereon that, when executed, by one or more processors can cause the one or more processors to perform the methods. The methods may further be described as computer-implemented methods, or performed as part of a system that includes a camera, a display device, a computer processor, or computer storage media.

FIG. 6 provides an example method 600 for rendering a redacted image. At block 610 image data is captured. The image data may represent a spatial area of a real-world environment, and may be captured by a camera. At block 620, a redaction marker may be detected in the image data. For example, redaction marker component 210 of AR engine 200 in FIG. 2 may be used for detecting the redaction marker in the image data. In the real-world environment, the redaction marker may comprise a QR code and include redaction instructions that identify an area relative to the redaction marker as a viewable area. In some cases, the redaction instructions may identify an area relative to the redaction marker as an area to be redacted.

At block 630, redaction instructions are interpreted from the redaction marker for the spatial area. Redaction instructions may be interpreted using redaction marker component 210 illustrated in FIG. 2. Based on the redaction instructions interpreted at block 630, the image data may be redacted at block 640. Image data may be redacted by deleting or encrypting a portion of the image data not associated with the viewable area. In some cases, the image data may be redacted by deleting or encrypting a portion of the image data associated with the area to be redacted. The image data may be redacted to determine redacted image data. The image data may be redacted using redaction component 220 of FIG. 2.

At block 650, a redacted image is rendered using the redacted image data. The redacted image may include the viewable area, and the viewable area may correspond to the portion of the image data that was not redacted. The remaining portion, e.g., the portion associated with the image data that was redacted, may be obscured or omitted from view in the rendered image. The redacted image may be rendered using image render component 230 of FIG. 2. At block 660, the redacted image is displayed. The redacted image may be displayed on a display device. In some cases, the display device, the camera, at least one computer processor or computer storage media may be integrated into a single device, such as a wearable headset. In some cases these components may be communicatively distributed in any combination.

Turning now to FIG. 7, an example method 700 is provided for rendering a redacted image. At block 710, image data is received. Image data may be captured by a camera and represent a spatial area of a real-world environment. At block 720, a presence of a redaction marker may be determined from the image data. The presence of the redaction marker may be determined using redaction marker component 210 of FIG. 2. The presence of the redaction marker may indicate the redaction marker is in the FOV of the camera when the image data is captured. The redaction marker may be a QR code in some cases. At block 730, redaction instructions may be interpreted from the redaction marker, for example, using redaction marker component 210 of FIG. 2. The redaction instructions may be embedded in the redaction marker and identify an area relative to the redaction marker as a viewable area or identify an area relative to the redaction marker that is to be redacted, or both.

At block 740, the image data is redacted. The image may be redacted using redaction component 220 of FIG. 2. The image data may be redacted based on the redaction instructions. The image data may be redacted by deleting or encrypting a portion of the image data associated with the area to be redacted as identified by the redaction instruction, or by deleting or encrypting a portion of the image data not associated with the viewable area identified by the redaction instructions. The image data may be redacted based on the relative location of the camera to the redaction marker. In some cases, a first portion of the image data may be associated with a viewable area and may be determined based on the redaction instructions, while a second portion of the image data may be associated with an area to be redacted and be determined based on a camera location and a redaction marker location. Redacting the image data may include deleting or encrypting the second portion associated with the area to be redacted.

At block 750, the image is rendered. The image may be rendered using image render component 230 of FIG. 2. The image may be rendered using the redacted image information. At block 760, the image rendered at block 750 is stored in a database, such as database 140 of FIG. 1. In some cases, the rendered image may be displayed on a display device.

Turning now to FIG. 8, FIG. 8 provides another example method for rendering redacted images. At block 810, image data may be received. The image data may be captured from a camera and represent a spatial area of a real-world environment. At block 820, the image data may be redacted. For example, the image data may be redacted based on redaction instructions determined from a redaction marker in the FOV of the camera. The presence of the redaction marker may be determined using a machine learned model. In some cases, redaction instructions may identify an area relative to the redaction marker as a viewable area. Redacting the image data may include deleting or encrypting a portion of the image data not associated with the viewable area. In some cases, the redaction instructions identify an area relative to the redaction marker as an area to be redacted. Redacting the image data may include deleting or encrypting a portion of the image data associated with the area to be redacted. The image data may be further redacted based on the location of the camera.

At block 830, the redacted image is rendered. The image may be rendered using image render component 230 of FIG. 2. The redacted image data may be used to render the redacted image. At block 840, the redacted image rendered at block 830 or redacted image data may be stored in a database. In some cases, the method comprises displaying the redacted image on a display device.

Figure 9:
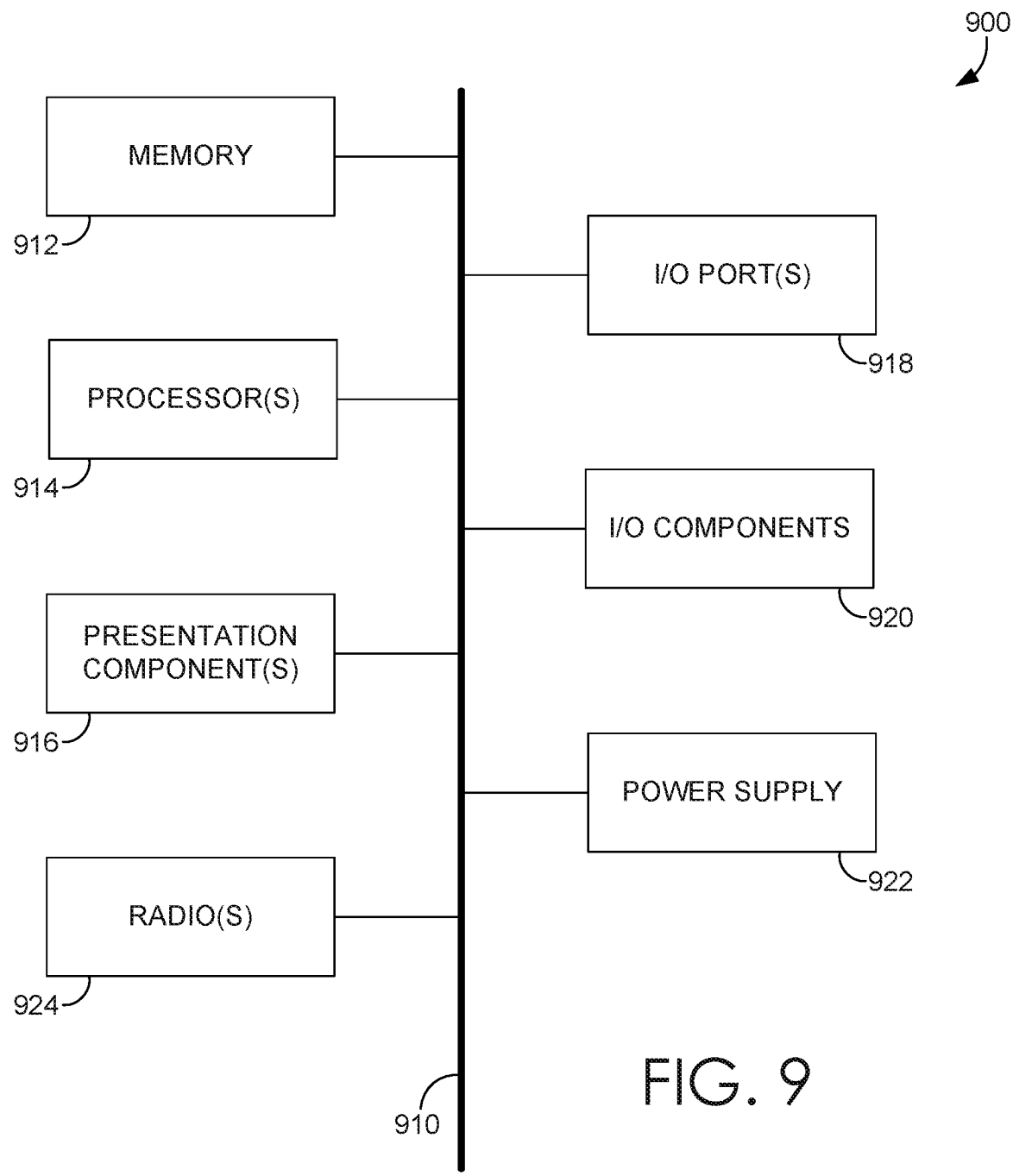
FIG. 9 is an example computing device suitable for use with the aspects described herein.

Having described example embodiments of the present technology, an exemplary operating environment in which embodiments of the disclosure may be implemented is described in order to provide a general context for various aspects of the technology. Referring reference now to FIG. 9, an exemplary operating environment for implementing embodiments of the present disclosure is shown and designated generally as computing device 900. Computing device 900 is but one example of a suitable computing environment and is not intended to suggest any limitation as to the scope of use or functionality. Neither should the computing device 900 be interpreted as having any dependency or requirement relating to any one or combination of components illustrated.

The technology of this disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The described technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that this is the nature of the art, and reiterate that the diagram of FIG. 9 is merely an illustration of a computing device that can be used in connection with one or more embodiments of the present invention. Distinction is not made between such categories as "workstation," "server," "laptop," "hand-held device," etc., as all are contemplated within the scope of FIG. 9 and reference to "computing device," "user device," or "user computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory, or other memory technology; CD-ROM; digital versatile disks (DVD) or other optical disk storage; magnetic cassettes, magnetic tape, magnetic disk storage, or other magnetic storage devices; or any other medium that can be used to store the desired information and that can be accessed by computing device 900. Computer storage media excludes signals per se.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media such as acoustic, RF, infrared, and the like. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Example presentation components include a display device, speaker, printing component, vibrating component, etc.

I/O port 918 allows computing device 900 to be logically coupled to other devices including I/O components 920, some of which may be built in. Illustrative components include a microphone, joystick, game pad, satellite dish, scanner, printer, wireless device, etc.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both. Thus, "a or b" includes either "a or b" as well as "a and b", or both.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A system for rendering a redacted image, the system comprising:
   a camera;
   a display device;
   at least one processor; and
   computer storage media storing computer-usable instructions that, when executed by the at least one processor, cause the at least one processor to:
   receive image data captured using the camera, the image data representing a spatial area;
   detect a redaction marker within the image data captured by the camera, wherein the redaction marker comprises redaction instructions for the spatial area;
   interpret, from the redaction marker, the redaction instructions for the spatial area;
   redact the image data based on the redaction instructions;

render the redacted image using the redacted image data; and display, on the display device, the redacted image.

2. The system of claim 1, wherein the camera, the display device, the at least one processor, and the computer storage media are integrated into a single user device.

3. The system of claim 1, wherein at least one of the camera, the display device, the at least one processor, or the computer storage media are integrated into a wearable headset.

4. The system of claim 1, wherein the redaction marker is a high contrast image asymmetrical around x- and y-axes.

5. The system of claim 1, wherein the redaction instructions identify an area relative to the redaction marker as a viewable area, and wherein the image data is redacted by deleting or encrypting a portion of the image data not associated with the viewable area.

6. The system of claim 1, wherein the redaction instructions identify an area relative to the redaction marker as an area to be redacted, and wherein the image data is redacted by deleting or encrypting a portion of the image data associated with the area to be redacted.

7. One or more computer storage media storing computer-usable instructions that, when executed by at least one processor, cause the at least one processor to perform operations for rendering a redacted image, the operations comprising:

receiving image data captured from a camera, the image data representing a spatial area;

determining, from the image data, a presence of a redaction marker in a field of view of the camera, wherein the redaction marker comprises redaction instructions for the spatial area;

interpreting, from the redaction marker, the redaction instructions for the spatial area;

redacting the image data based on the redaction instructions;

rendering the redacted image using the redacted image data; and storing the redacted image for display on a display device.

8. The storage media of claim 7, further comprising displaying the redacted image on the display device.

9. The storage media of claim 7, wherein redacting the image data based on the redaction instructions further comprises:

determining a first portion of the image data associated with a viewable area based on interpreting the redaction instructions; and determining a second portion of the image data associated with an area to be redacted based on a camera location and a redaction marker location, wherein redacting the image data includes deleting or encrypting the second portion of the image data associated with the area to be redacted.

10. The storage media of claim 7, wherein the redaction marker is a high contrast image asymmetrical around x- and y-axes.

11. The storage media of claim 7, wherein the redaction instructions identify an area relative to the redaction marker as a viewable area, and wherein the image data is redacted by deleting or encrypting a portion of the image data not associated with the viewable area.

12. The storage media of claim 7, wherein the redaction instructions identify an area relative to the redaction marker as an area to be redacted, and wherein the image data is redacted by deleting or encrypting a portion of the image data associated with the area to be redacted.

13. The storage media of claim 7, further comprising determining a location of the camera relative to the redaction marker, wherein the image data is redacted based on the relative location of the camera.

14. A computer-implemented method for rendering a redacted image, the computer-implemented method comprising:

receiving image data captured from a camera, the image data representing a spatial area;

redacting the image data based on redaction instructions determined from a redaction marker within a field of view of the camera, wherein the redaction marker comprises the redaction instructions for the spatial area;

rendering the redacted image using the redacted image data; and storing the redacted image on one or more computer storage media.

15. The computer-implemented method of claim 14, further comprising displaying the redacted image on a display device.

16. The computer-implemented method of claim 14, wherein the redaction marker is a high contrast image asymmetrical around x- and y-axes.

17. The computer-implemented method of claim 14, further comprising determining a presence of the redaction marker within the field of view of the camera from the image data using a machine learned model.

18. The computer-implemented method of claim 14, wherein the redaction instructions identify an area relative to the redaction marker as a viewable area, and wherein the image data is redacted by deleting or encrypting a portion of the image data not associated with the viewable area.

19. The computer-implemented method of claim 14, wherein the redaction instructions identify an area relative to the redaction marker as an area to be redacted, and wherein the image data is redacted by deleting or encrypting a portion of the image data associated with the area to be redacted.

20. The computer-implemented method of claim 14, further comprising receiving a location of the camera, wherein the image data is redacted based on the location of the camera.

* * * * *